Jan. 21, 1969　　　J. M. BEACH ETAL　　　3,423,104
VEHICLE WHEEL STEERING APPARATUS
Filed April 21, 1966　　　　　　　　　　　　Sheet 1 of 3
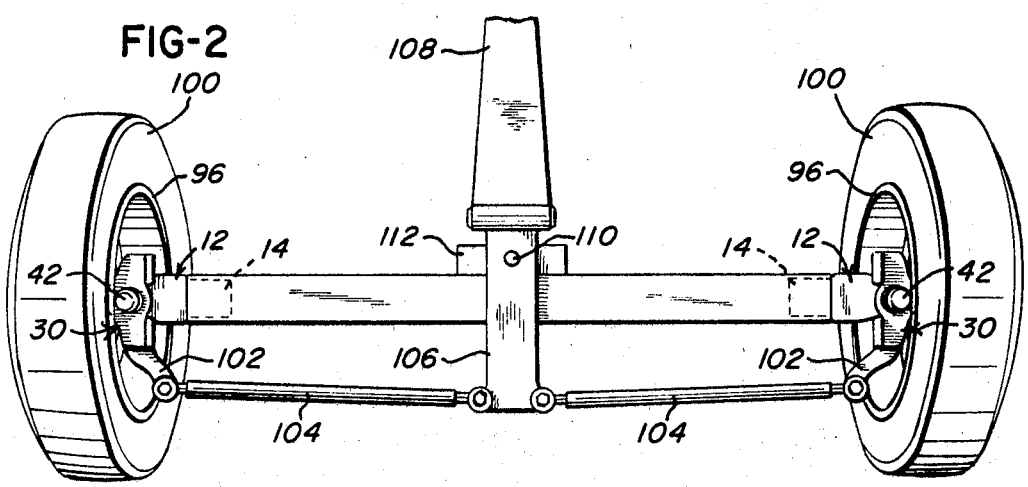
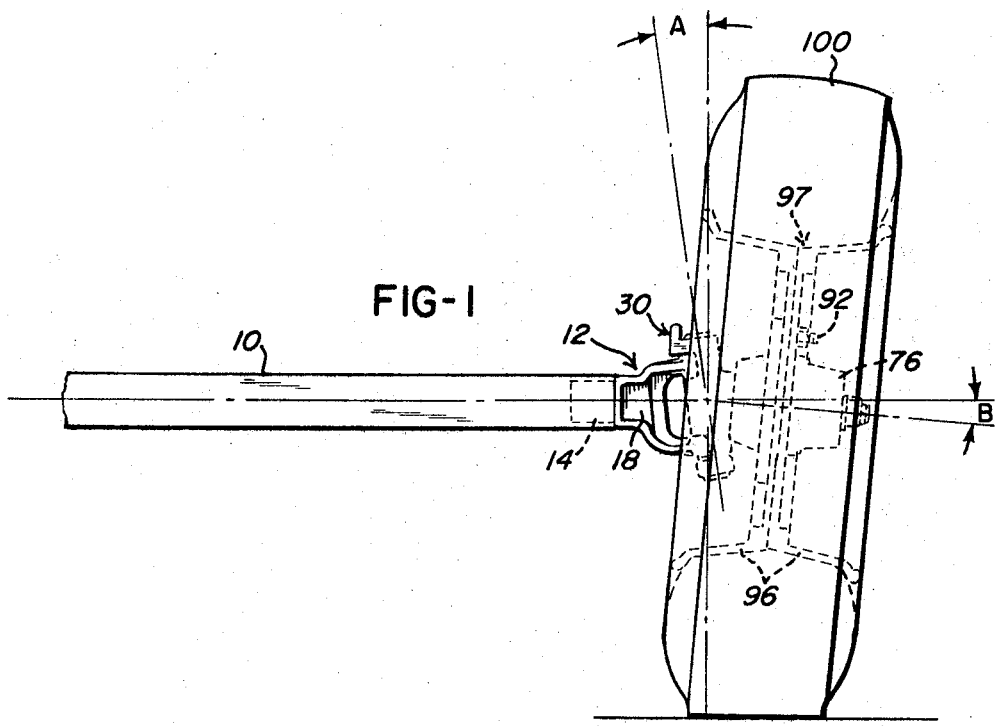
INVENTORS
JOHN M. BEACH
HARRY H. CECIL
ARTHUR R. WHITE
GEORGE S. ZIEGLER
BY *William R. Jacox*
ATTORNEY

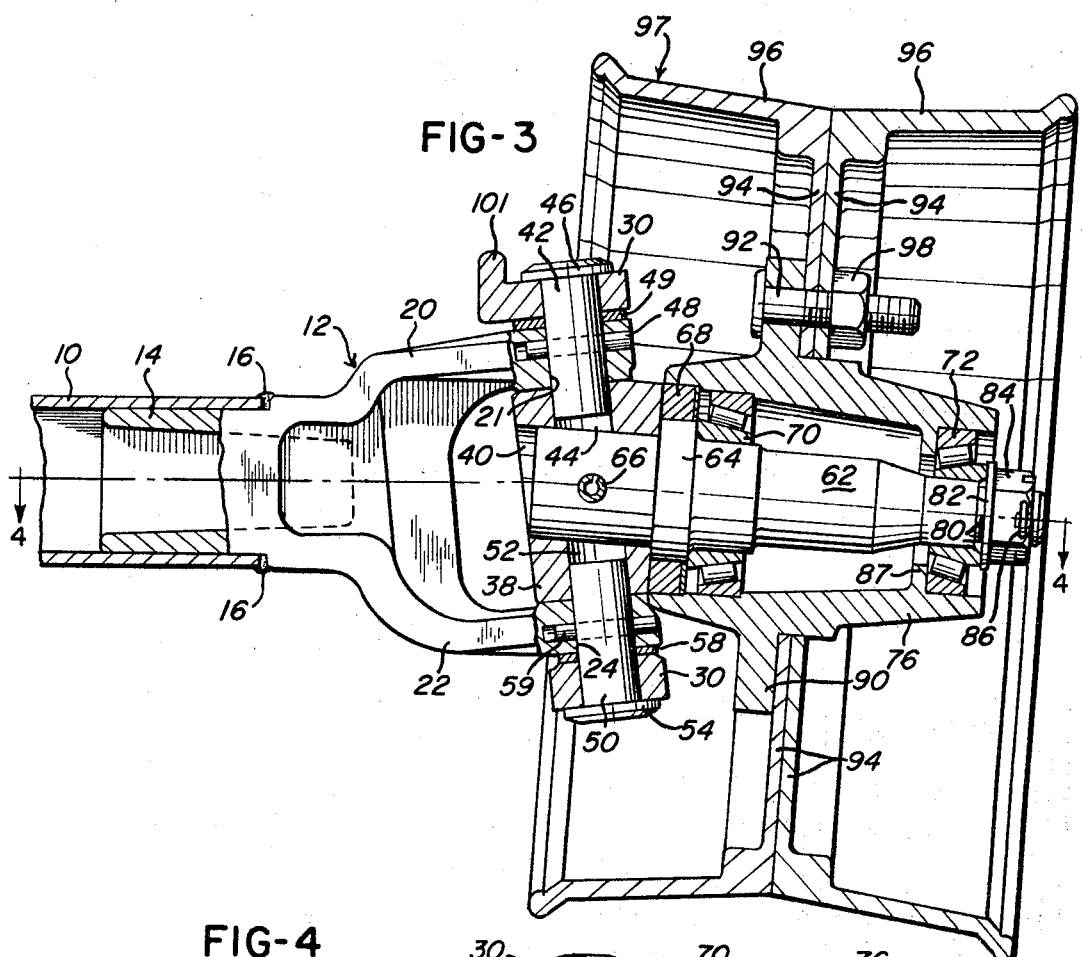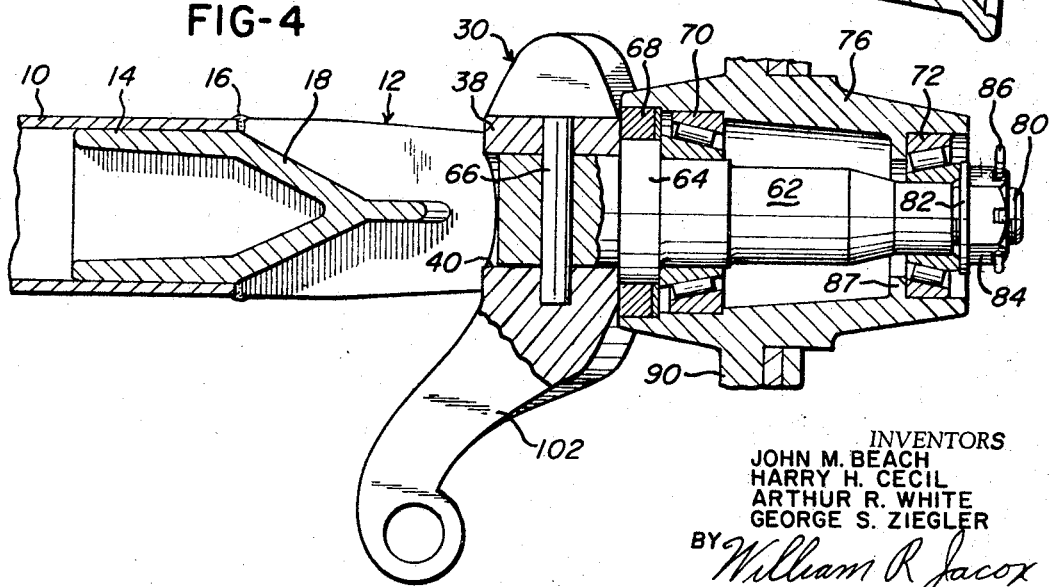

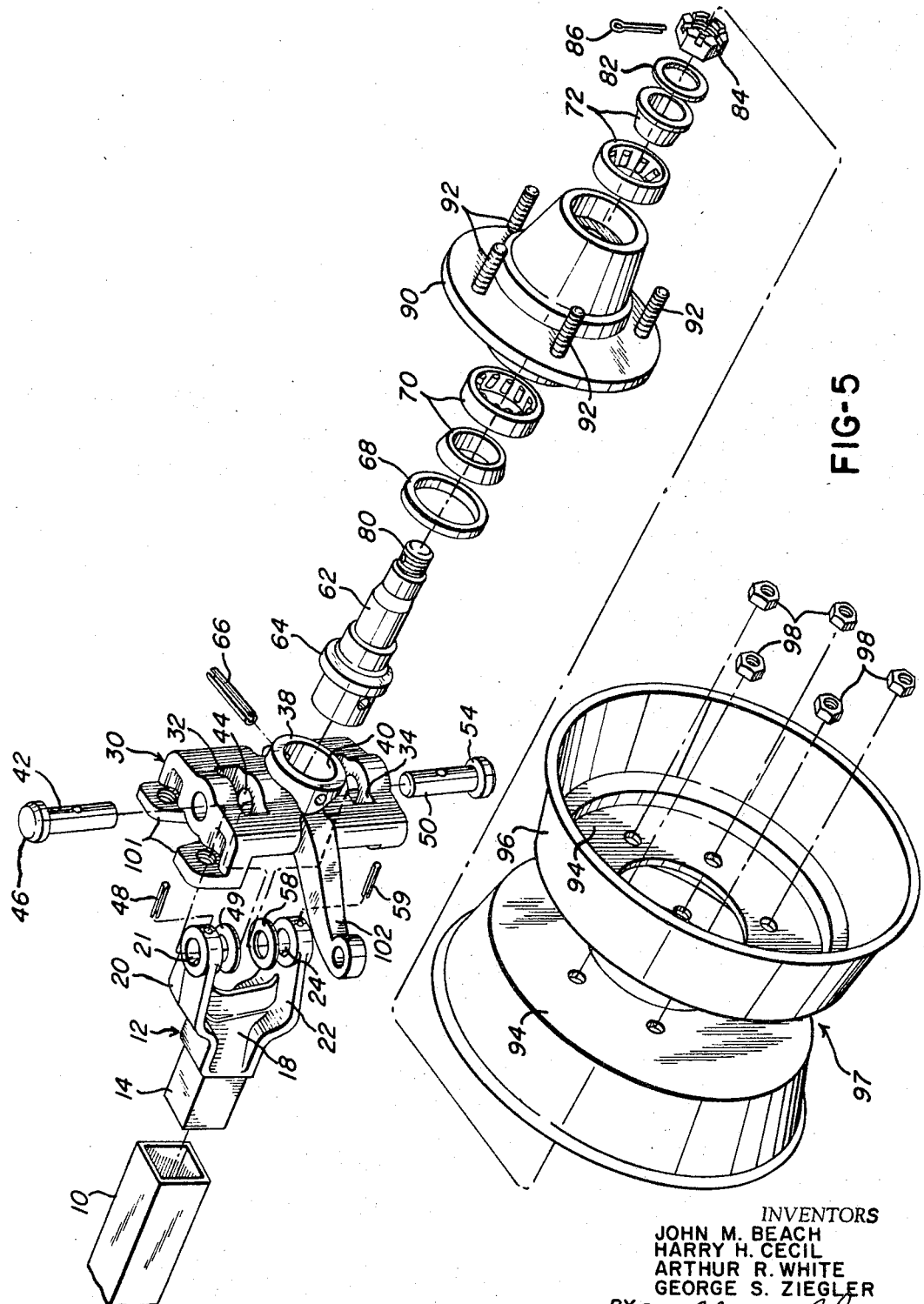

United States Patent Office 3,423,104
Patented Jan. 21, 1969

3,423,104
VEHICLE WHEEL STEERING APPARATUS
John M. Beach, Dayton, Harry H. Cecil, Brookville, Arthur R. White, Dayton, and George S. Ziegler, Miamisburg, Ohio, assignors to J. M. Beach Manufacturing, Inc., Dayton, Ohio, a corporation of Ohio
Filed Apr. 21, 1966, Ser. No. 544,259
U.S. Cl. 280—96.1     3 Claims
Int. Cl. B62d 7/06

ABSTRACT OF THE DISCLOSURE

Vehicle wheel steering apparatus in which king pin structure comprises a pair of king pin members which are coaxially disposed and which pivotally join a connector member to an axle. A spindle is attached to the connector member. By this means the spindle is pivotally joined to the axle. Preferably, the connector member has a pivotal axis which is at an angle other than 90 degrees with respect to both the longitudinal axis of the axle and the longitudinal axis of the spindle. The spindle is adapted to carry a rotatable wheel member. Thus, the radius of pivotal movement of the wheel member about the axis of the king pin members is very short.

Background of the invention

It is an object of this invention to provide vehicle wheel steering apparatus by which a wheel member can travel over rough terrain or can travel over an abutment or drop into a depression without transmission of appreciable shock or disturbance to the remainder of the apparatus.

Another object of this invention is to provide vehicle wheel steering apparatus which is capable of withstanding high loads and forces.

Another object of this invention is to provide such mechanism and structure which can be produced at relatively low costs and which is long-lived.

Other objects and advantages reside in the construction of parts, the combination thereof, the method of manufacture, and the mode of operation, as will become more apparent from the following description.

In the drawings:

FIGURE 1 is a fragmentary front view of vehicle wheel steering apparatus of this invention.

FIGURE 2 is a top view drawn on a reduced scale of vehicle wheel steering apparatus of this invention.

FIGURE 3 is an enlarged sectional view of vehicle wheel steering apparatus of this invention.

FIGURE 4 is a sectional view, with parts broken away, taken substantially on line 4—4 of FIGURE 3.

FIGURE 5 is an exploded perspective view of vehicle wheel steering apparatus of this invention.

Referring to the drawings in detail, an axle 10 or a portion thereof is shown in each of the figures. Preferably, the axle 10 is hollow or at least hollow at each end thereof. The axle 10 is adapted to be horizontally disposed. A yoke 12 is carried at each end of the axle 10. Each yoke 12 has a stem 14 which is disposed within an end of the axle 10 and which is secured thereto in any suitable manner, such as by welds 16 or the like. The stem 14 of the yoke 12 is shown as having a generally V-shaped portion 18, as best shown in FIGURE 4.

Each yoke 12 has an upper part 20 which has a hole 21 therethrough and a lower part 22 which has a hole 24 therethrough, as shown in FIGURE 5.

A bracket or connector member 30, best shown in FIGURE 5, is attached to each yoke 12. The bracket or connector member 30 is provided with a horizontally elongate opening 32 therein within which the upper part 20 of the yoke 12 is slidably disposed. The bracket or connector member 30 also has a horizontally elongate opening 34 therein within which the lower part 22 of the yoke 12 is slidably disposed.

Intermediate the opening 32 and the opening 34, the bracket or connector member 30 has a sleeve 38. The sleeve 38 is slidably positioned between the upper part 20 and the lower part 22 of the yoke 12. The sleeve 38 is provided with a bore 40 therein.

As shown in FIGURE 3, a king pin member 42 extends through the hole 21 in the upper part 20 of the yoke 12. The king pin member 42 also slidably extends into a hole 44 in the sleeve 38. The king pin member 42 is shown as having a head 46 in engagement with the upper portion of the bracket 30. The king pin member 42 also extends through a thrust washer member 49 which is disposed between the upper part 20 of the yoke 12 and the bracket 30. A locking pin 48 is snugly positioned within the upper part 20 of the yoke 12 within the king pin member 42 and secures the position of the king pin member 42 with respect to the yoke 12.

A king pin member 50 extends through the hole 24 in the lower part 22 of the yoke 12. The king pin member 50 also extends into a hole 52 in the sleeve 38. The king pin member 50 is shown as having a head 54 positioned below the bracket 30. The king pin member 50 also extends through a thrust washer member 58 which is disposed between the lower part 22 of the yoke 12 and the bracket 30. A locking pin 59 is snugly positioned within the lower part 22 of the yoke 12 and within the king pin member 50 and secures the king pin member 50 with respect to the yoke 12.

The holes 21 and 24 of the yoke 12 are substantially aligned one with the other but are so positioned with respect to the yoke 12 that as the king pin members 42 and 50 extend therethrough, the king pin members 42 and 50 are vertically inclined at a suitable angle A, as shown in FIGURE 1. Thus, the connector member 30 is pivotal about an inclined axis established by the king pin members 42 and 50.

A spindle 62 snugly fits within the bore 40 of the sleeve 38. The spindle 62 has a collar 64 which engages the sleeve 38 for determining the position of the spindle 62 with respect to the sleeve 38. A locking pin 66 is firmly positioned within the sleeve 38 and within the spindle 62 for securing the relationship between the sleeve 38 and the spindle 62.

An annular sealing member 68 encompasses the collar 64 of the spindle 62 and engages the sleeve 38. A bearing member 70 is carried by the spindle 62 and engages the collar 64. A bearing member 72 also is carried by the spindle 62 in spaced relationship from the bearing 70.

A hub 76 closely encompasses the bearings 70 and 72 and is carried thereby so that the hub 76 is rotatable upon the spindle 62. The spindle 62 has a threaded end portion 80, shown in FIGURE 5, which carries a thrust washer 82 and a nut 84, the nut 84 being threadedly attached thereto. The washer 82 and the nut 84 retain the bearing 72 upon the spindle 62. The bearing 72 engages an inner portion 87 of the hub 76 and retains the position of the hub 76 upon the spindle 62. A split pin 86 extends through the nut 84 and through the end portion 80 of the spindle 62 and secures the relationship therebetween.

The hub 76 has a peripheral flange portion 90 which has a plurality of bolts 92 extending therethrough. The bolts 92 also extend through inwardly extending flanges 94 of a pair of wheel sections 96 which form a wheel 97. A nut 98 is threadedly attached to each bolt 92 and secures the wheel sections 96 with respect to the flange 90 of the hub 76.

A tire member 100 is carried by each wheel 97, as shown in FIGURES 1 and 2.

As illustrated in FIGURES 1, 2, and 3, the spindle 62 may be angularly inclined with respect to the axle 10. FIGURE 1 illustrates inclination of the spindle 62 at a suitable angle B with respect to the longitudinal axis of the axle 10. Thus, the wheel members 97 and the tires 100 are angularly inclined.

If desired, each connector member 30 may be provided with one or more lugs 101, shown in FIGURES 3 and 5, which may be used to support brake structure.

Attached to each connector member 30 integrally or otherwise, in an arm 102 which is pivotally connected to a tie rod member 104, as shown in FIGURE 2. Each tie rod member 104 is also pivotally attached to any suitable actuator mechanism, herein shown as comprising a turning plate 106 and a tow bar 108 or the like, the tow bar 108 being pivotally connected to the turning plate 106. The turning plate 106 is pivotally supported by a pivot pin 110, as shown in FIGURE 2. The pivot pin 110 is also connected to any suitable support structure 112 which is shown attached to the axle 10.

Thus, by lateral movement of the tow bar 108 the turning plate 106 is pivotally moved about the pivot pin 110 and moves the tie rod members 104. Movement of the rod members 104 causes each of the arms 102 to pivotally move its respective connector member 30. Pivotal movement of each connector member 30 is about the axis established by its respective king pin members 42 and 50. Thus, angular movement of each spindle 62 is about the axis established by its respective king pin members 42 and 50. Therefore, steering movement or angular movement of each wheel 97 is about the axis established by its respective king pin member 42 and 50.

Due to the fact that each pair of the king pin members 42 and 50 are substantially within the confines of one of the wheel sections 96, the radius of pivotal movement of each wheel 97 about the axis established by the king pin members 42 and 50 is very short. Therefore, if one or both of the tires 100 engage protuberances or depressions or otherwise irregular terrain during rolling movement of the tires 100 and the wheels 97, pivotal movement of the connector members 30 is a minimum. Thus, the degree of movement of the arms 102 and the tie rod members 104 is a minimum. Therefore, the tires 100 may travel over rough terrain or may engage abutments or depressions with transmission of minimum shock or disturbance to the tow bar 108.

The invention having thus been described, the following is claimed:

1. Vehicle wheel steering apparatus comprising:
   an axle,
   a yoke attached to the axle at an end thereof, the yoke having an upper part and a lower part, the parts being spaced apart,
   a connector member having a sleeve portion disposed between the upper part of the yoke and the lower part of the yoke,
   a pair of coaxial spaced apart king pin members carried by the yoke, there being a king pin member extending through the upper part of the yoke and into the connector member and pivotally attaching the connector member to the yoke, there being a king pin member extending through the lower part of the yoke and into the connector member and pivotally attaching the connector member to the yoke,
   a spindle having a part within the sleeve portion of the connector member, pin means attaching the spindle to the sleeve portion of the connector member, the spindle extending from the sleeve portion of the connector member in a direction away from the yoke, the spindle being adapted to rotatably support wheel structure.

2. Vehicle wheel steering apparatus comprising:
   an axle,
   a yoke attached to the axle at an end thereof and extending therefrom, the yoke having an upper part and a lower part, the parts being spaced apart,
   a connector member provided with a first opening and a second opening, the upper part of the yoke being positioned within the first opening of the connector member, the lower part of the yoke being positioned within the second opening of the connector member, the connector member having a sleeve disposed between the first opening and the second opening,
   a pair of axially aligned king pin members partially disposed within the yoke and angular with respect to the axle, one of the king pin members extending through the upper part of the yoke and into the first opening of the connector member and pivotally attaching the connector member to the yoke, the other king pin member extending through the lower part of the yoke and into the second opening of the connector member and pivotally attaching the connector member to the yoke,
   a pair of locking pins, there being a locking pin extending through a part of the upper portion of the yoke and into its respective king pin member, there being a locking pin extending through a part of the lower portion of the yoke and into its respective king pin member, the locking pins thus securing the king pin members to the yoke,
   a spindle disposed within the sleeve and extending from the connector member at an angle with respect to the axle,
   a pin extending through a portion of the connector member and through a portion of the spindle and attaching the spindle to the connector member,
   and wheel structure rotatably carried by the spindle.

3. Vehicle wheel steering apparatus comprising:
   an axle,
   a yoke attached to the axle at an end thereof, the yoke having an upper part and a lower part, the parts being spaced apart,
   a connector member having a sleeve portion disposed between the upper part and lower part of the yoke,
   a pair of axially aligned king pin members attached to the yoke, there being a king pin member extending through the upper part of the yoke and into the sleeve portion of the connector member and pivotally attaching the connector member to the yoke, there being a king pin member extending through the lower part of the yoke and into the sleeve portion of the connector member and pivotally attaching the connector member to the yoke,
   a spindle having a part within the sleeve portion of the connector member, the spindle extending from the sleeve in a direction from the yoke,
   pin means attaching the part of the spindle which is within the sleeve portion of the connector member to the sleeve portion,
   and wheel structure rotatably carried by the spindle.

References Cited

UNITED STATES PATENTS

| 1,050,810 | 1/1913  | Cowles       | 280—96.3 X |
| 1,899,347 | 2/1933  | Mogford et al. | 301—124  |
| 1,968,022 | 7/1934  | Bijur        | 280—96.1 X |
| 1,982,377 | 11/1934 | Duby         | 280—96.3   |
| 2,364,183 | 12/1944 | Ash          | 280—96.1   |

KENNETH H. BETTS, *Primary Examiner.*